(12) United States Patent
Shaffer et al.

(10) Patent No.: US 7,328,587 B2
(45) Date of Patent: Feb. 12, 2008

(54) INTEGRATED ADAPTIVE CAPACITY CONTROL FOR A STEAM TURBINE POWERED CHILLER UNIT

(75) Inventors: Dennis Lee Shaffer, Thomasville, PA (US); Russell Mark Thompson, York, PA (US); Stephen Michael Kachmar, Dover, PA (US); Eric John Smyder, York, PA (US); Brenda Jane Roberts, Dover, PA (US); Daniel J. Petroskie, Goldsboro, PA (US); Ryan Perry Eisensmith, York, PA (US)

(73) Assignee: York International Corporation, York, PA (US)

( * ) Notice: Subject to any disclaimer, the term of this patent is extended or adjusted under 35 U.S.C. 154(b) by 574 days.

(21) Appl. No.: 11/015,388

(22) Filed: Dec. 17, 2004

(65) Prior Publication Data

US 2005/0160748 A1 Jul. 28, 2005

Related U.S. Application Data

(60) Provisional application No. 60/539,014, filed on Jan. 23, 2004.

(51) Int. Cl.
*F25B 1/00* (2006.01)
*F25B 49/00* (2006.01)
*F02D 23/00* (2006.01)

(52) U.S. Cl. .......................... 62/228.1; 62/126; 60/602
(58) Field of Classification Search .............. 62/228.1, 62/259.3, 126, 127; 60/600, 602; 417/228
See application file for complete search history.

(56) References Cited

U.S. PATENT DOCUMENTS

| | | |
|---|---|---|
| 2,803,192 A | 8/1957 | Crabtree |
| 3,513,662 A | 5/1970 | Golber |
| 3,744,932 A | 7/1973 | Prevett |
| 3,959,635 A | 5/1976 | Tanco |
| 4,084,406 A | 4/1978 | Brenneman |
| 4,093,868 A | 6/1978 | Manning |
| 4,151,725 A | 5/1979 | Kountz et al. |
| 4,152,902 A | 5/1979 | Lush |
| 4,199,961 A | 4/1980 | Carter et al. |
| 4,248,055 A | 2/1981 | Day, III et al. |
| 4,272,012 A | 6/1981 | Molnar et al. |
| 4,282,718 A | 8/1981 | Kountz et al. |
| 4,455,614 A | 6/1984 | Martz et al. |
| 4,497,031 A | 1/1985 | Froehling et al. |
| 4,562,531 A | 12/1985 | Enterline et al. |
| 4,614,089 A | 9/1986 | Dorsey |
| 4,970,870 A | 11/1990 | Midlang et al. |

(Continued)

FOREIGN PATENT DOCUMENTS

| | | |
|---|---|---|
| EP | 0 186 332 A1 | 7/1986 |
| EP | 0 366 219 A2 | 5/1990 |
| EP | 0 525 612 A1 | 2/1993 |
| EP | 0 573 827 A2 | 12/1993 |
| EP | 0 593 225 A1 | 4/1994 |

(Continued)

*Primary Examiner*—Chen Wen Jiang
(74) *Attorney, Agent, or Firm*—McNees Wallace & Nurick LLC

(57) ABSTRACT

A control system for a steam turbine driven chiller unit is provided. The control system automatically utilizes the full range of the governor, compressor pre-rotation vanes, and hot gas bypass valve capabilities to control the capacity of the chiller and provide anti-surge and override control functions to prevent undesirable operational ranges while maintaining maximum efficiency of operation.

27 Claims, 11 Drawing Sheets

U.S. PATENT DOCUMENTS

| | | |
|---|---|---|
| RE33,620 E | 6/1991 | Persem |
| 5,097,405 A | 3/1992 | Sato |
| 5,222,370 A | 6/1993 | James |
| 5,355,691 A | 10/1994 | Sullivan et al. |
| 5,367,888 A | 11/1994 | Muston et al. |
| 5,391,925 A | 2/1995 | Casten et al. |
| 5,553,997 A | 9/1996 | Goshaw et al. |
| 5,628,199 A | 5/1997 | Hoglund et al. |
| 5,651,264 A | 7/1997 | Lo et al. |
| 5,669,225 A | 9/1997 | Beaverson et al. |
| 5,798,941 A | 8/1998 | McLeister |
| 6,026,651 A | 2/2000 | Sandelman |
| 6,050,083 A | 4/2000 | Meckler |
| 6,179,214 B1 | 1/2001 | Key et al. |
| 6,202,431 B1 | 3/2001 | Beaverson et al. |
| 6,250,080 B1 | 6/2001 | Shelor et al. |
| 6,286,313 B1 | 9/2001 | Heaf |
| 6,427,464 B1 | 8/2002 | Beaverson et al. |
| 6,453,687 B2 | 9/2002 | Sharood et al. |
| 6,463,740 B1 | 10/2002 | Schmidt et al. |
| 6,481,978 B2 | 11/2002 | Zamalis et al. |
| 6,581,399 B2 | 6/2003 | Benedict et al. |
| 6,658,870 B1 | 12/2003 | Jenkins |
| 6,679,071 B1 | 1/2004 | Storey et al. |
| 2002/0193890 A1 | 12/2002 | Pouchak |
| 2003/0140637 A1 | 7/2003 | Masui et al. |
| 2003/0195640 A1 | 10/2003 | Krocker et al. |

FOREIGN PATENT DOCUMENTS

| | | |
|---|---|---|
| EP | 0 910 015 A1 | 4/1999 |
| EP | 1 225 401 A1 | 7/2002 |
| JP | 58-184601 | 10/1983 |
| JP | 59-30116 | 2/1984 |
| JP | 4-225723 | 8/1992 |
| JP | 5-35449 | 2/1993 |
| JP | 2000 20111 | 1/2000 |
| WO | WO 96/39577 | 12/1996 |
| WO | WO 97/38270 | 10/1997 |
| WO | WO 99/54628 | 10/1999 |
| WO | WO 00/48376 | 8/2000 |
| WO | WO 03/090000 A1 | 10/2003 |

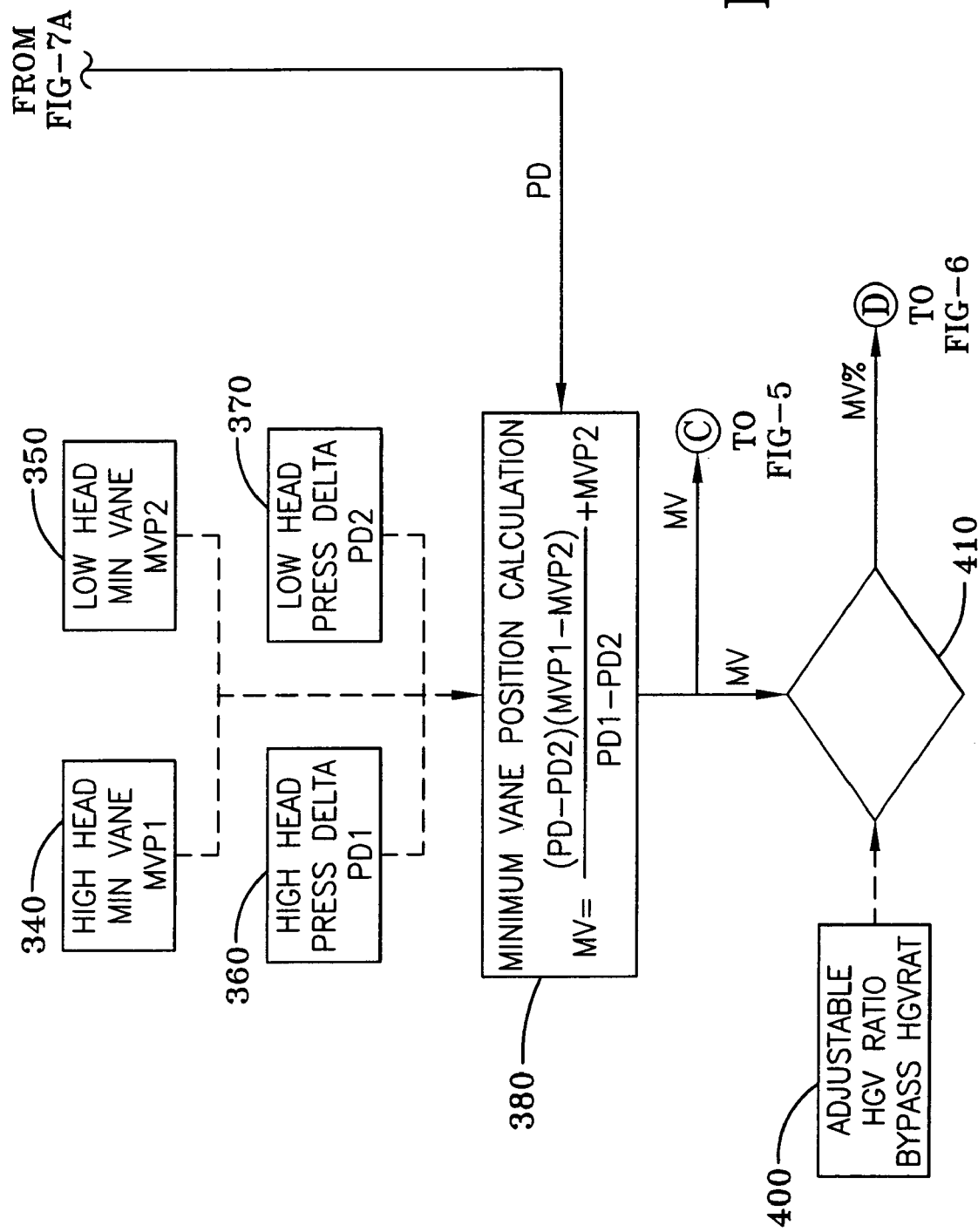

INTEGRATED ADAPTIVE CAPACITY CONTROL FOR A STEAM TURBINE POWERED CHILLER UNIT

CROSS REFERENCE TO RELATED APPLICATIONS

This application claims the benefit of U.S. Provisional Application No. 60/539,014, filed Jan. 23, 2004.

BACKGROUND OF THE INVENTION

The present invention relates generally to a control system for a chiller unit, and more specifically, to a control system for a steam turbine powered chiller unit that integrates the control operations of both the steam turbine system and the chiller unit.

While most heating, ventilation and air conditioning (HVAC), refrigeration, or chiller systems use electric motors to power the corresponding compressor(s) in the chiller system, some chiller systems can use a steam turbine to power the compressor. Typically, these steam turbine powered chiller systems have required an excessive amount of fieldwork to install and connect the chiller system to the steam turbine system. Some previous steam turbine driven chiller units or systems have involved the packaging of the steam turbine on the chiller unit and resulted in unique installations requiring field routed piping and instrumentation to link the steam turbine system with the chiller unit to complete the installation.

In these previous steam turbine driven chillers systems, many of the controls used with the steam turbine and the chiller unit, e.g., steam turbine governor control, pre-rotation vane control, hot gas control, turbine torque limitation control and surge prevention control, were "stand alone" controls that operated independently of the other controls and did not communicate with the other controls. For example, a turbine speed control could operate substantially independently from a pre-rotation vane control and both the turbine speed control and the pre-rotation vane control could operate substantially independently of a hot gas bypass valve control. This independent operation of controls often resulted in inefficiencies in the operation of the steam turbine driven chiller system, as one control operation on one part of the system would remove or limit the efficiency gained from another control operation on another part of the system. In addition to losses in efficiency, the use of independent controls also limited effective surge prevention in the compressor of the chiller system because the separate systems were not able to measure or monitor the system pressure differential (condenser pressure minus evaporator pressure).

Therefore, what is needed is a control system for a steam turbine powered chiller unit that can integrate into a single control panel both the controls for the steam turbine and the controls for the chiller unit, while maximizing the efficiency of operation of both the steam turbine and the chiller unit.

SUMMARY OF THE INVENTION

One embodiment of the present invention is directed to a method of controlling the capacity of a chiller system driven by a steam turbine. The method includes the steps of providing a steam system having a steam supply, a steam turbine and a steam condenser connected in a steam loop and providing a refrigerant system having a compressor driven by the steam turbine, a refrigerant condenser, and an evaporator connected in a refrigerant loop. The method further includes the steps of sensing a value representative of a load of the refrigerant system, determining a system pressure differential of the refrigerant system, and controlling a speed of the steam turbine in response to the sensed load value and the determined system pressure differential to control capacity of the chiller system.

Another embodiment of the present invention is directed to a chiller system having a steam system including a steam supply, a steam turbine and a steam condenser connected in a steam loop and a refrigerant system including a compressor driven by the steam turbine, a refrigerant condenser, and an evaporator connected in a refrigerant loop. The chiller system further includes a central control panel to control operation of both the steam system and the refrigerant system. The central control panel has a capacity control system. The capacity control system is configured to adjust a speed of the steam turbine to control the capacity of the refrigerant system in response to a leaving chilled liquid temperature and a system pressure differential.

Another embodiment of the present invention is directed to a chiller system including a steam system having a steam supply, a steam turbine and a steam condenser connected in a steam loop and a refrigerant system having a compressor, a refrigerant condenser, and an evaporator connected in a refrigerant loop. The compressor is driven by the steam turbine. The chiller system also includes a turbine baseplate configured and disposed to mount the steam turbine in the chiller system. The turbine baseplate includes a coupling device to rigidly connect the turbine baseplate and the compressor. The chiller system further includes a central control panel to control operation of both the steam system and the refrigerant system.

One advantage of the present invention is the integration of the chiller with the steam turbine into a pre-packaged unit.

Another advantage of the present invention is a central control system for use with both pre-packaged steam turbine driven chiller systems and "as-built" steam turbine driven chiller systems Still another advantage of the present invention is a central control system that utilizes the full range of controls for the steam turbine driven chiller system to control the capacity of the chiller and to provide anti-surge and override control functions to prevent unsafe operation of the system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIGS. 7A and 7B are a logic diagram illustrating one embodiment of step 502 in FIG. 5.

Wherever possible, the same reference numbers will be used throughout the drawings to refer to the same or like parts.

DETAILED DESCRIPTION OF THE INVENTION

Figure 1:
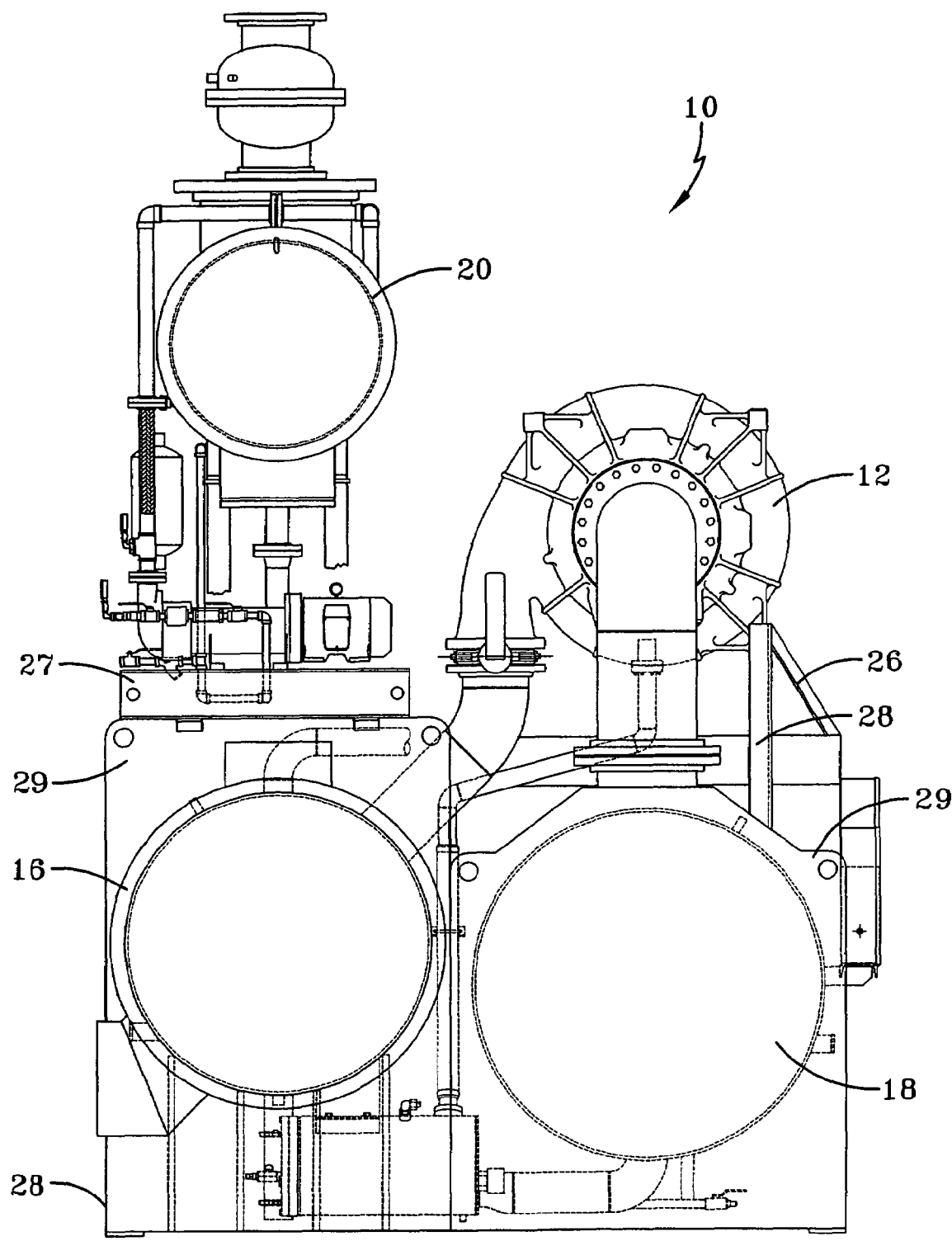
FIG. 1 is a side view of a steam turbine driven chiller unit of the present invention.
Figure 2:
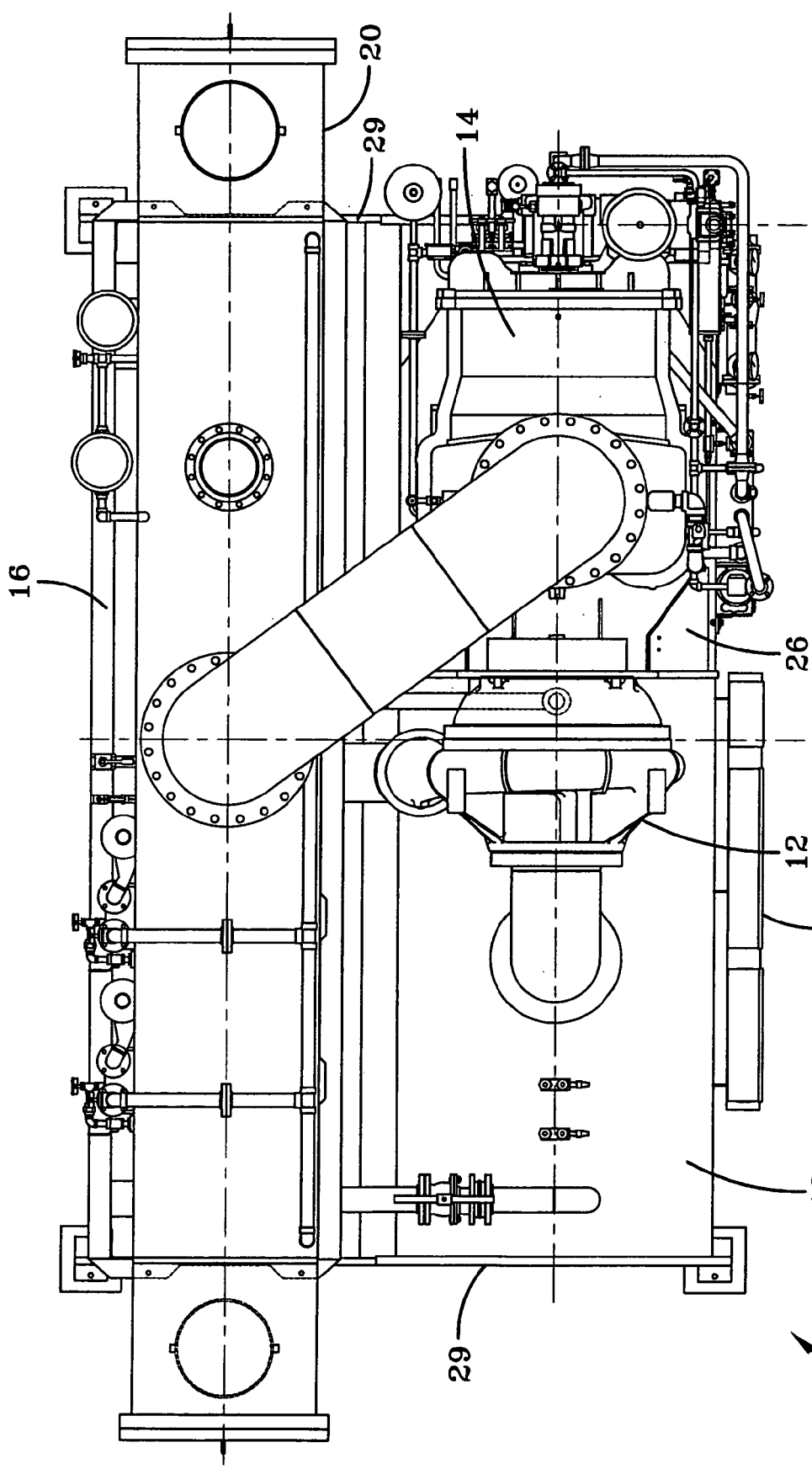
FIG. 2 is a top view of the steam turbine driven chiller unit of FIG. 1.
Figure 3:
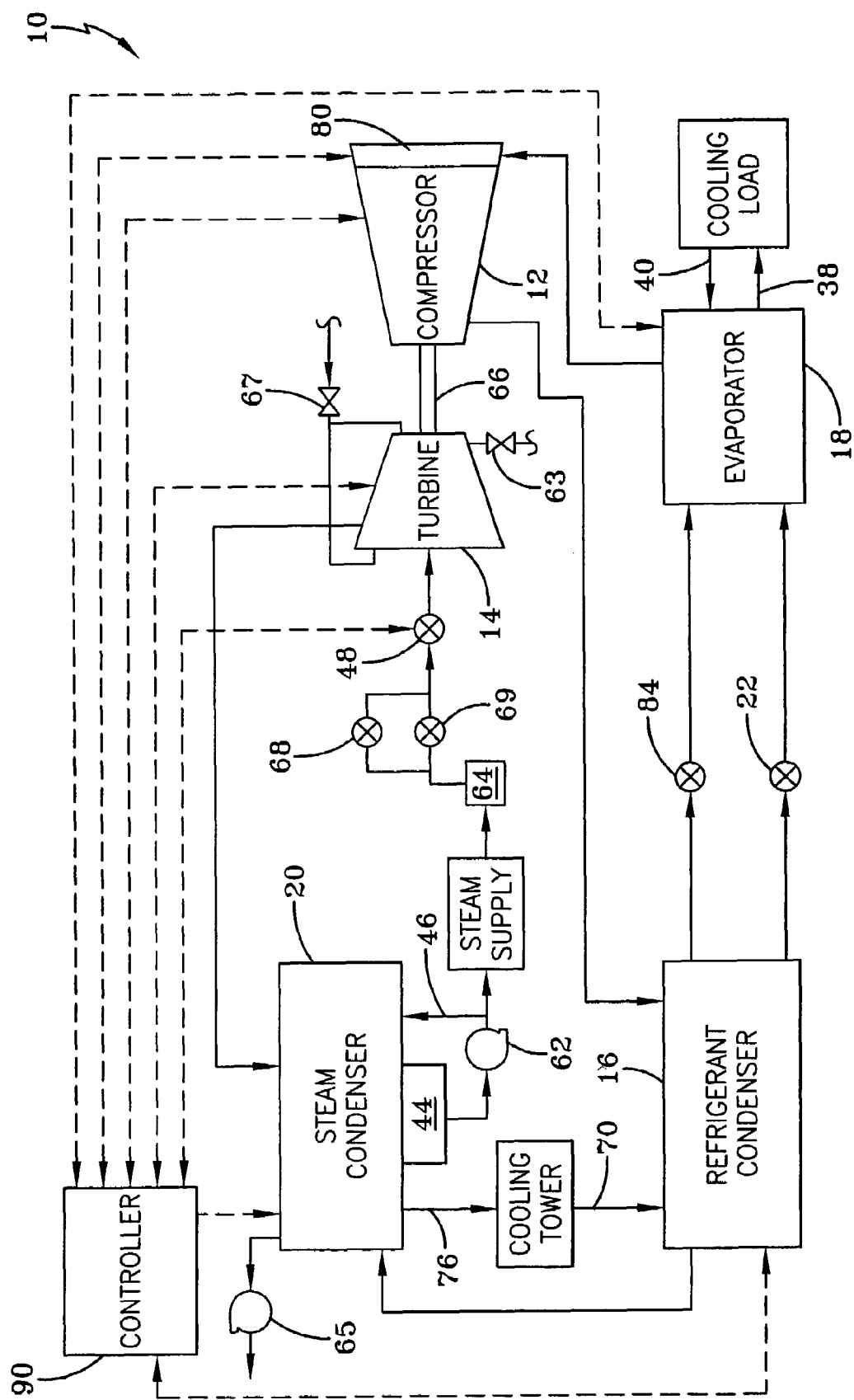
FIG. 3 is a schematic diagram of steam, refrigerant and cooling water flow for a steam turbine driven chiller unit of the present invention.

A general system to which the invention is applied is illustrated, by means of example, in FIGS. 1-3. As shown, the HVAC, refrigeration, or chiller system 10 includes a compressor 12, a steam turbine 14, a refrigerant condenser 16, a water chiller or evaporator 18, a steam condenser 20, an expansion device 22 and a control panel or controller 90. The operation of the control panel 90 will be discussed in greater detail below. The chiller system 10 further includes a compressor lubrication system (not shown) and a turbine lubrication system (not shown). The conventional liquid chiller system 10 includes many other features that are not shown in FIGS. 1-3. These features have been purposely omitted to simplify the drawing for ease of illustration.

In a preferred embodiment, a "structural frame" permits the stacking or vertical arrangement of the major components of the chiller system 10 to provide a prepackaged unit that occupies less floor space with a smaller footprint than a field fabricated unit where the components are arranged horizontally. The structural frame can include a turbine baseplate 26, a steam condenser baseplate 27, a plurality of frame members 28, and tube end sheets 29. Tube end sheets 29 can provide both the internal support and refrigerant/water separation for the ends of heat exchange tubes (not shown) within refrigerant condenser 16 and evaporator 18. Frame members 28 are preselected structural components and materials, such as plate steel and tubular supports, that can support the corresponding components of the chiller system 10.

Figure 8:
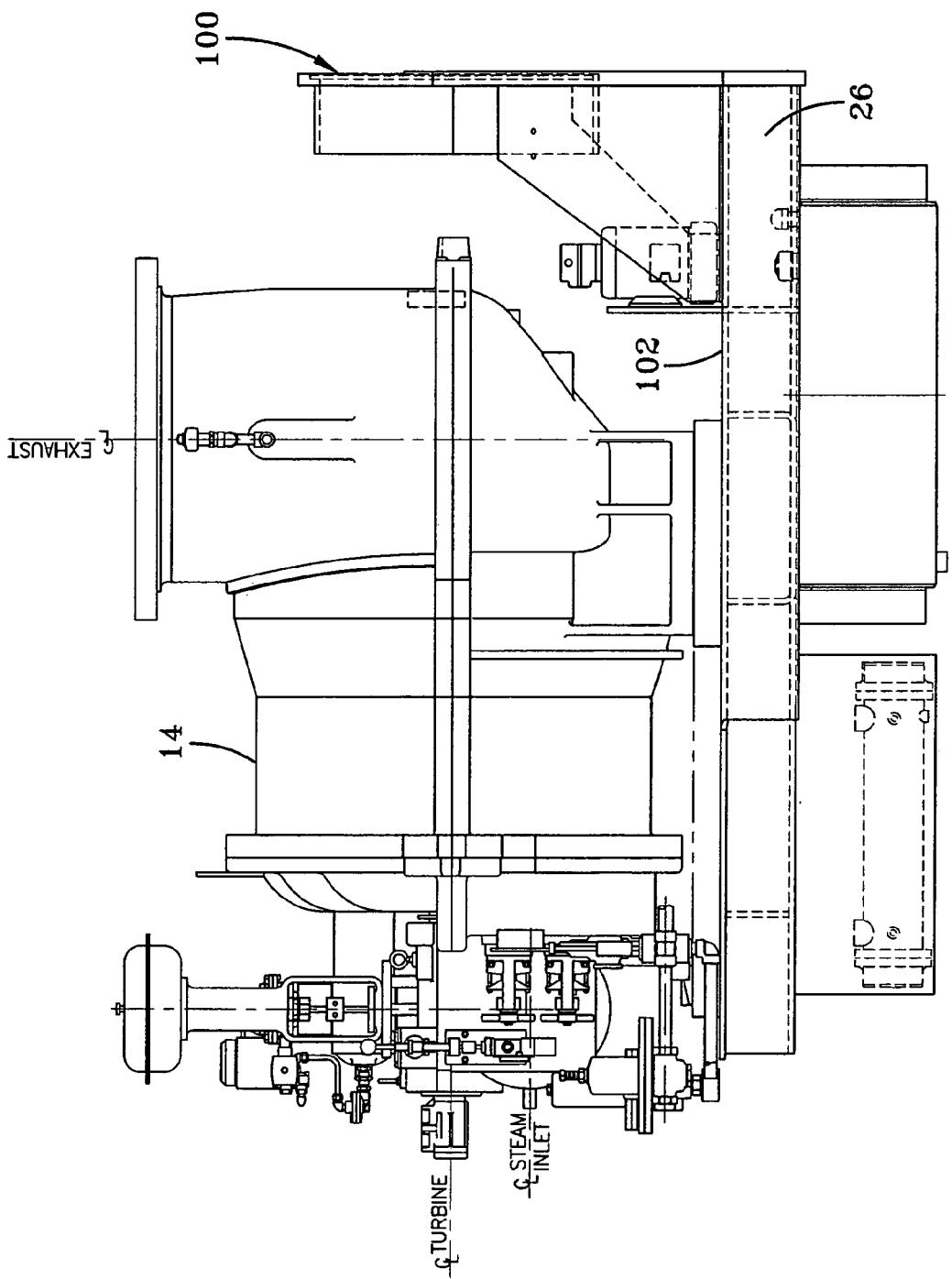
FIG. 8 is an enlarged side view of the steam turbine and turbine baseplate of the present invention.
Figure 9:
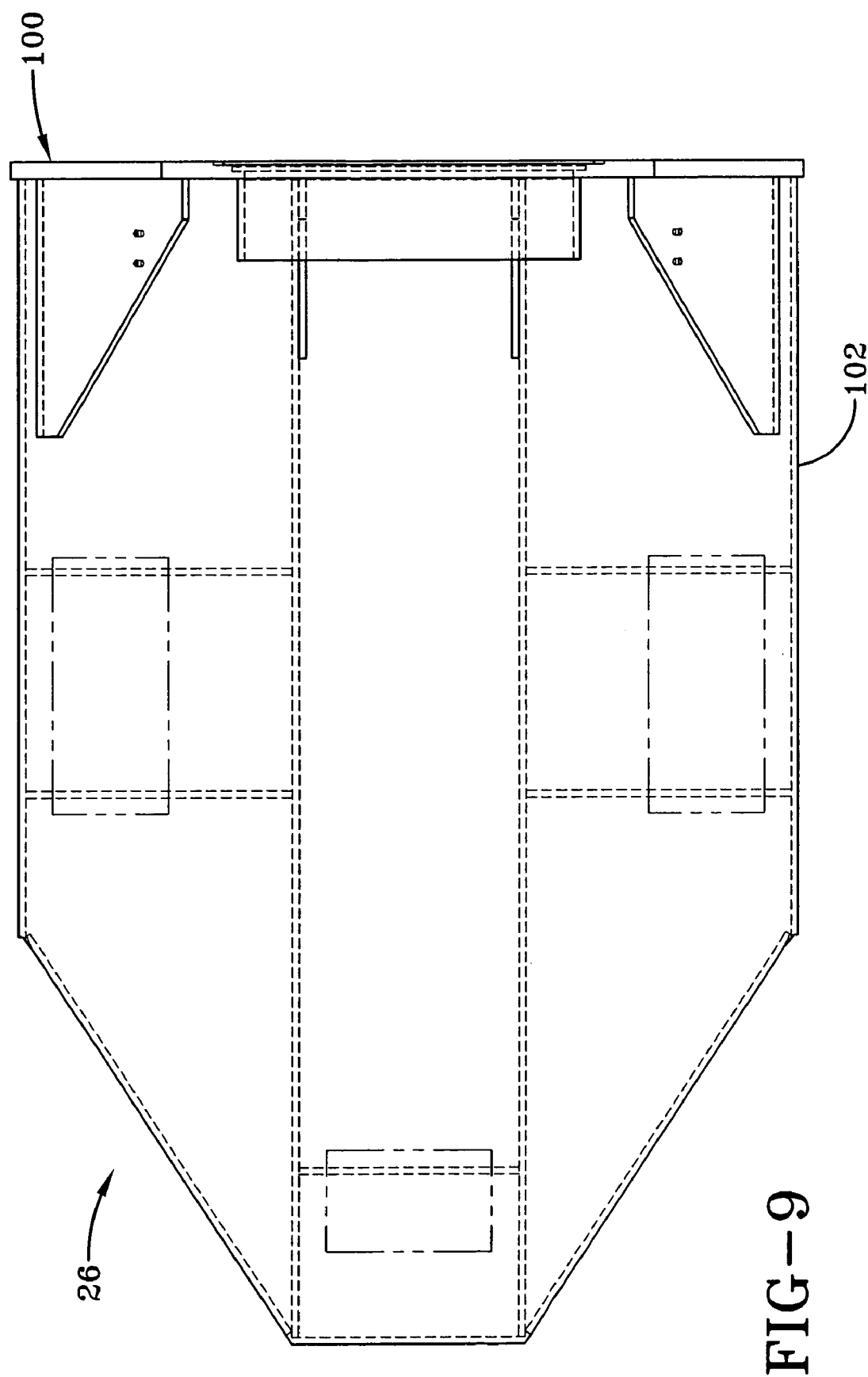
FIG. 9 is a top view of the steam turbine baseplate of the present invention.
Figure 10:
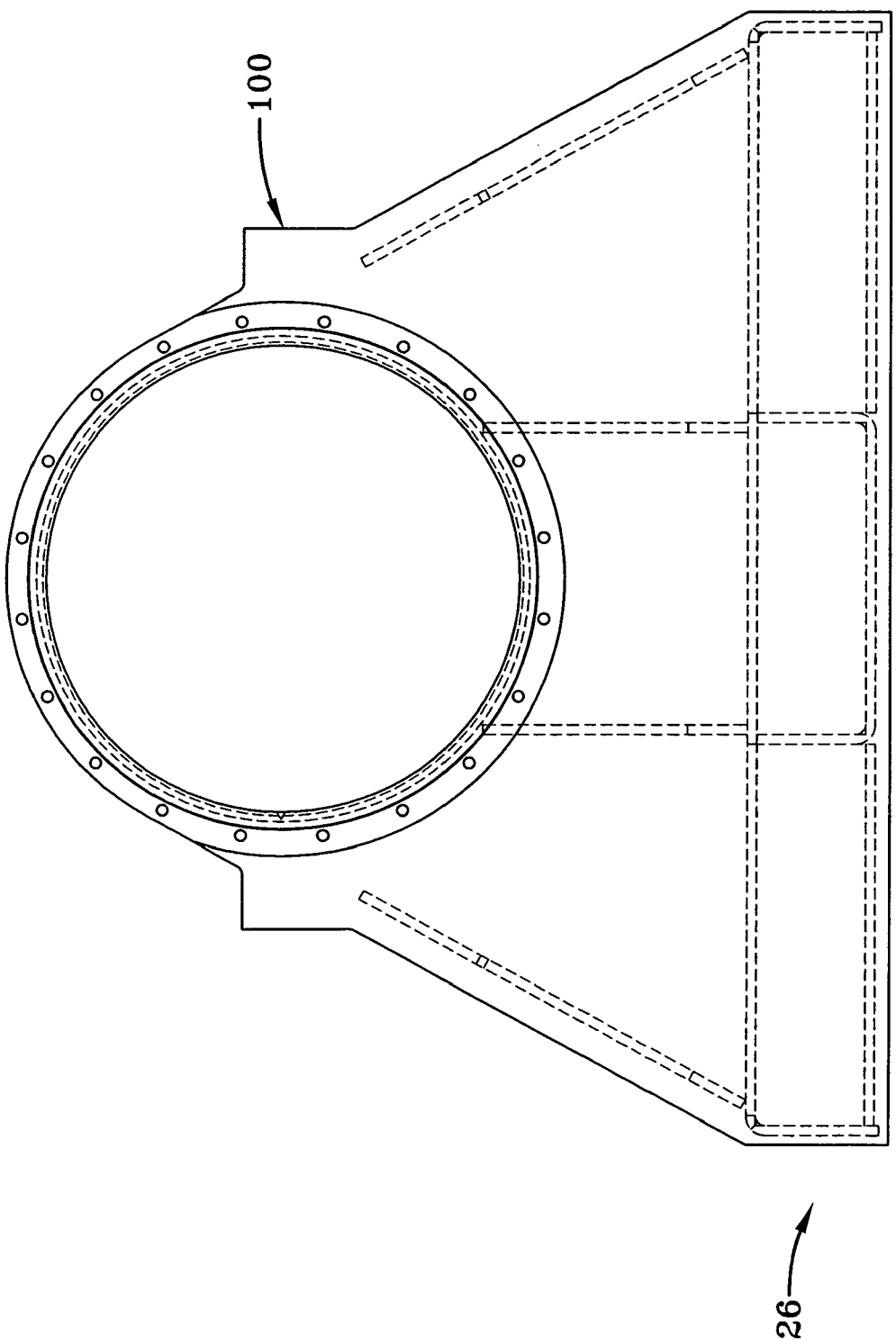
FIG. 10 is a compressor side view of the steam turbine baseplate of the present invention.

The turbine baseplate 26 is shown in greater detail in FIGS. 8-10. The turbine baseplate 26 preferably has a rigid bolting face 100 that is substantially perpendicular to a base portion 102 of the turbine baseplate 26. The bolting face 100 can be bolted directly to the machined face of the compressor housing. The rigid bolting face or D-flange coupling device 100 can provide for a more rigid mounting or interconnection between the compressor housing and turbine baseplate 26 and thus provide a more rigid interconnection between the compressor 12 and the steam turbine 14. In addition, the D-flange coupling device 100 can afford a predictable degree of shaft alignment for the compressor 12 and the steam turbine 14. The turbine baseplate 26 can be supported on a shaft end by the compressor mounting arrangement and can be supported on a steam inlet end by an evaporator tube sheet 29. By mounting the turbine baseplate 26 as described above, the turbine baseplate 26 is isolated from the evaporator shell, and any movement of the turbine baseplate 26 resulting from the thermal expansion and contraction of the evaporator shell is minimized. Preferably the steam turbine 14 and the turbine baseplate 26 are manufactured as modular unit for incorporation into the chiller system 10.

In one embodiment of the present invention, the structural frame incorporates a steam turbine 14, and steam turbine baseplate 26, in combination with a refrigerant condenser 16, evaporator 18 and compressor 12 into a pre-packaged unit for installation. The steam condenser 20 with all associated condensate system, vacuum system and level system components (and piping) and steam condenser baseplate 27 are preferably manufactured as a separate modular unit from the pre-packaged unit and include all necessary interconnections for connection to the pre-packaged unit. The steam condenser 20 and steam condenser baseplate 27 can be field installed above the refrigerant condenser 16 during installation of chiller system 10. The steam condenser modular unit is preferably mounted on the refrigerant condenser tube sheets 29 and spans or extends between the refrigerant condenser tube sheets 29. By mounting the steam condenser modular unit as described above, the steam condenser modular unit is isolated from the refrigerant condenser shell and any movement of the steam condenser modular unit resulting from the thermal expansion and contraction of the refrigerant condenser shell is minimized. In an alternate embodiment, the steam condenser modular unit can be mounted on the plant floor to satisfy a particular plant layout requirement.

In another embodiment of the present invention, the use of the pre-packaged unit with the steam turbine 14, refrigerant condenser 16, evaporator 18 and compressor 12 along with the steam condenser modular unit permits a fixed steam exhaust piping arrangement. By providing the steam exhaust piping arrangement for the chiller system 10, the steam exhaust piping arrangement can be designed to maintain all loads on the steam turbine 14 and steam condenser 20 connections within acceptable ranges and thereby minimize any impact on the connection between the steam turbine 14 and compressor 12.

In the chiller system 10, the compressor 12 compresses a refrigerant vapor and delivers it to the refrigerant condenser 16. The compressor 12 is preferably a centrifugal compressor, however any other suitable type of compressor can be used. The compressor 12 is driven by the steam turbine 14, which steam turbine 14 can drive the compressor 12 at either a single speed or at variable speeds. Preferably, steam turbine 14 is a multistage, variable speed turbine that is capable of operating compressor 12 at a speed that more closely optimizes the efficiency of the chiller system 10. More preferably, steam turbine 14 is capable of driving compressor 12 at speeds in a range of about 3200 rpm to about 4500 rpm. The supply of steam to the steam turbine 14 is preferably dry saturated steam within a range of about 90 to about 200 psi. The flow of steam supplied to steam turbine 14 can be modulated by a governor 48 to vary the speed of the steam turbine 14, and therefore vary the speed of compressor 12 to adjust the capacity of the compressor by providing a greater or lower amount of refrigerant volumetric flow through the compressor 12. In another embodiment, the steam turbine 14 can drive the compressor at only a single speed and other techniques are needed to adjust the capacity of the compressor 12, e.g., the use of pre-rotation vanes 80 and/or a hot gas bypass valve 84.

The refrigerant vapor delivered by the compressor 12 to the refrigerant condenser 16 enters into a heat exchange relationship with a fluid, e.g., air or water, and undergoes a phase change to a refrigerant liquid as a result of the heat exchange relationship with the fluid. In a preferred embodiment, the refrigerant vapor delivered to the refrigerant condenser 16 enters into a heat exchange relationship with a fluid, preferably water, flowing through a heat-exchanger coil connected to a cooling tower. The refrigerant vapor in the refrigerant condenser 16 undergoes a phase change to a refrigerant liquid as a result of the heat exchange relationship with the fluid in the heat-exchanger coil. The condensed liquid refrigerant from refrigerant condenser 16 flows through an expansion device 22 to the evaporator 18.

The evaporator 18 can include a heat-exchanger coil having a supply line 38 and a return line 40 connected to a cooling load. A secondary liquid, e.g., water, ethylene or propylene glycol mixture, calcium chloride brine or sodium chloride brine, travels into the evaporator 18 via the return line 40 and exits the evaporator 18 via the supply line 38. The liquid refrigerant in the evaporator 18 enters into a heat exchange relationship with the secondary liquid to lower the temperature of the secondary liquid. The refrigerant liquid in the evaporator 18 undergoes a phase change to a refrigerant vapor as a result of the heat exchange relationship with the secondary liquid. The vapor refrigerant in the evaporator 18 exits the evaporator 18 and returns to the compressor 12 by a suction line to complete the cycle. It is to be understood that any suitable configuration of refrigerant condenser 16 and evaporator 18 can be used in the chiller system 10, provided that the appropriate phase change of the refrigerant in the refrigerant condenser 16 and evaporator 18 is obtained.

At the input or inlet to the compressor 12 from the evaporator 18, there are one or more pre-rotation vanes (PRV) or inlet guide vanes 80 that control the flow of refrigerant to the compressor 12, and thereby control the capacity of the compressor 12. Pre-rotation vanes 80 are positionable to any position between a substantially open position, wherein refrigerant flow is essentially unimpeded into compressor 12, and a substantially closed position, wherein refrigerant flow into compressor 12 is restricted. It is to be understood that in the closed position, pre-rotation vanes 80 may not completely stop the flow of refrigerant into compressor 12. An actuator is used to open the pre-rotation vanes 80 to increase the amount of refrigerant to the compressor 12 and thereby increase the cooling capacity of the system 10. Similarly, the actuator is used to close the pre-rotation vanes 80 to decrease the amount of refrigerant to the compressor 12 and thereby decrease the cooling capacity of the system 10. The actuator for the pre-rotation vanes 80 can open and close the pre-rotation vanes 80 in either a continuous manner or in a stepped or incremental manner.

The chiller system 10 can also include a hot gas bypass connection and corresponding valve 84 that connects the high pressure side and the low pressure side of the chiller system 10. In the embodiment illustrated in FIG. 3, the hot gas bypass connection and hot gas bypass valve (HGV) 84 connect the refrigerant condenser 16 and the evaporator 18 and bypass the expansion device 22. In another embodiment, the hot gas bypass connection and hot gas bypass valve 84 can connect the compressor suction line and the compressor discharge line. The hot gas bypass valve 84 is preferably used as a recirculation line for compressor 12 to recirculate refrigerant gas from the discharge of compressor 12, via refrigerant condenser 16, to the suction of compressor 12, via evaporator 18. The hot gas bypass valve 84 can be adjusted to any position between a substantially open position, wherein refrigerant flow is essentially unimpeded, and a substantially closed position, wherein refrigerant flow is restricted. The hot gas bypass valve 84 can be opened and closed in either a continuous manner or in a stepped or incremental manner. The opening of the hot gas bypass valve 84 can increase the amount of refrigerant gas supplied to the compressor suction to prevent surge conditions from occurring in compressor 12.

With regard to the steam turbine system, a steam supply provides steam to the steam turbine 14. The steam from the steam supply preferably enters a moisture separator 64. In the moisture separator 64, moisture-laden steam from the steam supply enters and is deflected in a centrifugally downward motion. The entrained moisture in the steam is separated out by a reduction in the velocity of the steam flow. Separated moisture then falls through a moisture outlet (not shown) and dry saturated steam flows upward and exits through a steam outlet (not shown) where it flows toward a main steam inlet block valve 69 and a steam inlet slow roll bypass valve 68. The main steam inlet block valve 69 and steam inlet slow roll bypass valve 68 can be positioned to control the amount of steam that flows toward a governor 48 during the slow roll ramp up to minimum rated speed at start up. The governor 48 is located in the steam supply line to regulate steam flow and is preferably located adjacent a steam inlet of steam turbine 14. The governor or governor valve 48 can be opened or closed in a continuous manner or in a stepped or incremental manner. Steam turbine 14 includes a steam inlet to receive the steam from the steam supply. The steam from the steam supply flows through the steam inlet and turns a rotatable turbine portion of the steam turbine 14 to extract the energy therefrom to turn a coupler 66 that interconnects the shafts (not shown) of steam turbine 14 and compressor 12. After rotating the turbine portion of the steam turbine 14, the steam then exits the steam turbine 14 through a steam exhaust.

In a preferred embodiment, the coupler 66 provides for a direct rotational connection between the steam turbine 14 and the compressor 12. In alternate embodiments, the coupler 66 can include one or more gearing arrangements (or other similar arrangements) to increase or decrease the relative rotational speeds between the steam turbine 14 and the compressor 12. In addition, one or both of the steam turbine 14 and compressor 12 can also include an internal gearing arrangement connected to the coupler 66 to adjust the relative rotational speeds of the steam turbine 14 or compressor 12.

In addition, a turbine steam ring drain valve 63 is provided to permit the operator to remove any condensate from the steam turbine 14 during the slow roll warm up of the steam turbine 14. A gland seal steam supply valve 67 can be used to admit steam to the gland seal supply pressure regulating valve during a slow roll. A steam condenser vacuum pump 65 evacuates the steam condenser and turbine exhaust to a desired vacuum that is required for the steam turbine 14 to produce the power required by the compressor 12.

The exhausted steam from steam turbine 14 flows to steam condenser 20. Within steam condenser 20, the steam/condensate flow from the steam turbine 14 enters into a heat exchange relationship with cooling water flowing through steam condenser 20 to cool the steam. Steam condenser 20 includes a hotwell 44 connected to a condensate recirculation system 46. Condensate recirculation system 46 includes a condensate outlet in the hotwell 44 that can provide or transfer condensate from the hotwell 44 to a condensate pump 62. From the condensate pump 62, the condensate is selectively provided to a condensate recirculation inlet of the steam condenser 20 and/or to a condensate return inlet of the steam supply. In this manner, condensate recirculation system 46 can maintain a preselected flow of condensate through steam condenser 20 and return condensate to the steam supply for further generation of steam.

As discussed above, cooling water from a cooling tower or other source, is preferably routed to the refrigerant condenser 16 by a cooling water supply line 70. The cooling water is circulated in the refrigerant condenser 16 to absorb heat from the refrigerant gas. The cooling water then exits the refrigerant condenser 16 and is routed or provided to the steam condenser 20. The cooling water is circulated in the steam condenser 20 to further absorb heat from the steam exhausted from the steam turbine 14. The cooling water flowing from the steam condenser 20 is directed to the cooling tower by a cooling water return line 76 to reduce the temperature of the cooling water, which then may be returned to refrigerant condenser 16 to repeat the cycle.

Typically, the steam condenser 20 operates at a greater temperature than the refrigerant condenser 16. By routing the cooling water through refrigerant condenser 16 and then the steam condenser 20, in a series or serial arrangement, the low temperature cooling water can absorb heat within the refrigerant condenser 16 then be transferred to the steam condenser 20 to absorb additional heat. In a preferred embodiment, this ability to use the cooling water to cool both the refrigerant condenser 16 and the steam condenser 20 can be accomplished by selecting the appropriate refrigerant condenser 16 and steam condenser 20. The refrigerant condenser 16 is selected such that the outlet cooling water temperature from the refrigerant condenser 16 is lower than the maximum acceptable inlet cooling water temperature for the steam condenser 20. This series or serial flowpath for condenser (refrigerant and steam) cooling water within the chiller system 10 can reduce the need for multiple supplies of cooling water, and can reduce the total amount of cooling water required for the chiller system 10.

Figure 4:
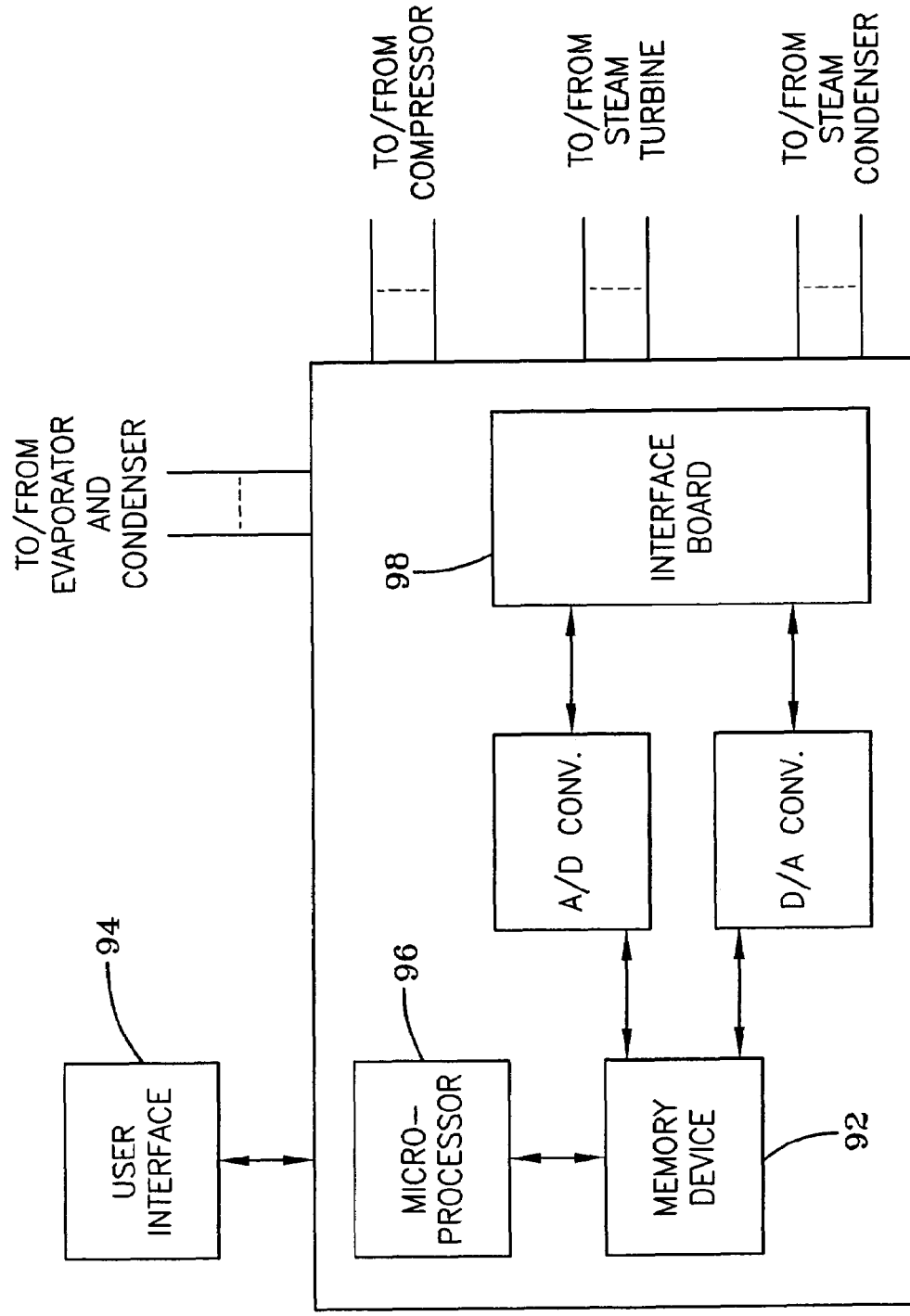
FIG. 4 is a schematic representation of a control system of the steam turbine driven chiller unit of the present invention.

As illustrated in FIG. 4, the control panel 90 includes analog to digital (A/D) and digital to analog (D/A) converters, a microprocessor 96, a non-volatile memory or other memory device 92, and an interface board 98 to communicate with various sensors and control devices of chiller system 10. In addition, the control panel 90 can be connected to or incorporate a user interface 94 that permits an operator to interact with the control panel 90. The operator can select and enter commands for the control panel 90 through the user interface 94. In addition, the user interface 94 can display messages and information from the control panel 90 regarding the operational status of the chiller system 10 for the operator. The user interface 94 can be located locally to the control panel 90, such as being mounted on the chiller system 10 or the control panel 90, or alternatively, the user interface 94 can be located remotely from the control panel 90, such as being located in a separate control room apart from the chiller system 10.

Microprocessor 96 executes or uses a single or central control algorithm or control system to control the chiller system 10 including the compressor 12, the steam turbine 14, the steam condenser 20 and the other components of the chiller system 10. In one embodiment, the control system can be a computer program or software having a series of instructions executable by the microprocessor 96. In another embodiment, the control system may be implemented and executed using digital and/or analog hardware by those skilled in the art. In still another embodiment, control panel 90 may incorporate multiple controllers, each performing a discrete function, with a central controller that determines the outputs of control panel 90. If hardware is used to execute the control algorithm, the corresponding configuration of the control panel 90 can be changed to incorporate the necessary components and to remove any components that may no longer be required.

The control panel 90 of the chiller system 10 can receive many different sensor inputs from the components of the chiller system 10. Some examples of sensor inputs to the control panel 90 are provided below, but it is to be understood that the control panel 90 can receive any desired or suitable sensor input from a component of the chiller system 10. Some inputs to the control panel 90 relating to the compressor 12 can be from a compressor discharge temperature sensor, a compressor oil temperature sensor, a compressor oil supply pressure sensor and a pre-rotation vane position sensor. Some inputs to the control panel 90 relating to the steam turbine 14 can be from a turbine shaft end bearing temperature sensor, a turbine governor end bearing temperature sensor, a turbine inlet steam temperature sensor, a turbine inlet steam pressure sensor, a turbine first stage steam pressure sensor, a turbine exhaust pressure sensor, a turbine speed sensor, and a turbine trip valve status sensor.

Some inputs to the control panel 90 relating to the steam condenser 20 can be from a hotwell condensate level sensor, a hotwell high level status sensor, and a hotwell low level status sensor. Some inputs to the control panel 90 relating to the refrigerant condenser 16 can be from an entering refrigerant condenser water temperature sensor, a leaving condenser water temperature sensor, a refrigerant liquid temperature sensor, a refrigerant condenser pressure sensor, a subcooler refrigerant liquid level sensor, and a refrigerant condenser water flow sensor. Some inputs to the control panel 90 relating to the evaporator 18 can be from a leaving chilled liquid temperature sensor, a return chilled liquid temperature sensor, an evaporator refrigerant vapor pressure sensor, a refrigerant liquid temperature sensor, and a chilled water flow sensor. In addition, other inputs to controller 90 include a HVAC&R demand input from a thermostat or other similar temperature control system.

Furthermore, the control panel 90 of the chiller system 10 can provide or generate many different control signals for the components of the chiller system 10. Some examples of control signals from the control panel 90 are provided below, but it is to be understood that the control panel 90 can provide any desired or suitable control signal for a component of the chiller system 10. Some control signals from the control panel 90 can include a turbine shutdown control signal, a compressor oil heater control signal, a variable speed oil pump control signal, a turbine governor valve control signal, a hotwell level control signal, a hot gas bypass valve control signal, a subcooler refrigerant liquid level control signal, a pre-rotation vane position control signal, and a steam inlet valve control signal. In addition, control panel 90 can send a turbine shutdown signal when either the technician has input a shutdown command into user interface 94, or when a deviation is detected from a preselected parameter recorded in memory device 92.

The central control algorithm executed by the microprocessor 96 on the control panel 90 preferably includes a capacity control program or algorithm to control the speed of the steam turbine 14, and thereby the speed of the compressor 12, to generate the desired capacity from compressor 12 to satisfy a cooling load. The capacity control program can automatically determine a desired speed for steam turbine 14 and compressor 12, preferably in direct response to the leaving chilled liquid temperature in the evaporator 18, which temperature is an indicator of the cooling load demand on the chiller system 10. After determining the desired speed, the control panel 90 sends or transmits control signals to the appropriate steam turbine system components to change the flow of steam supplied to steam turbine 14, thereby regulating the speed of steam turbine 14.

The capacity control program can maintain selected parameters of chiller system 10 within preselected ranges.

These parameters include turbine speed, chilled liquid outlet temperature, turbine power output, and anti-surge limits for minimum compressor speed and compressor pre-rotation vane position. The capacity control program employs continuous feedback from sensors monitoring various operational parameters described herein to continuously monitor and change the speed of turbine 14 and compressor 12 in response to changes in system cooling loads. That is, as the chiller system 10 requires either additional or reduced cooling capacity, the operating parameters of the compressor 12 in the chiller 10 are correspondingly updated or revised in response to the new cooling capacity requirement. To maintain maximum operating efficiency, the operating speed of the compressor 12 can be frequently changed or adjusted by the capacity control algorithm. Furthermore, separate from system load requirements, the capacity control program also continuously monitors the refrigerant system pressure differential to optimize the volumetric flow rate of refrigerant in chiller system 10 and to maximize the resultant steam efficiency of steam turbine 14.

The central control algorithm also includes other algorithms and/or software that provide the control panel 90 with a monitoring function of various operational parameters for chiller system 10 during both startup and routine operation of chiller system 10. Undesirable operational parameters, such as low turbine speed, low turbine oil pressure, or low compressor oil pressure, can be programmed into the control panel 90 with a logic function to shutdown the chiller system 10 in the event that undesired, or beyond system design, parameters are detected. Additionally, the central control algorithm has preselected limits for many of the operational parameters of the chiller system 10 and can prevent a technician from manually operating the chiller system 10 outside of these limits.

Figure 5:
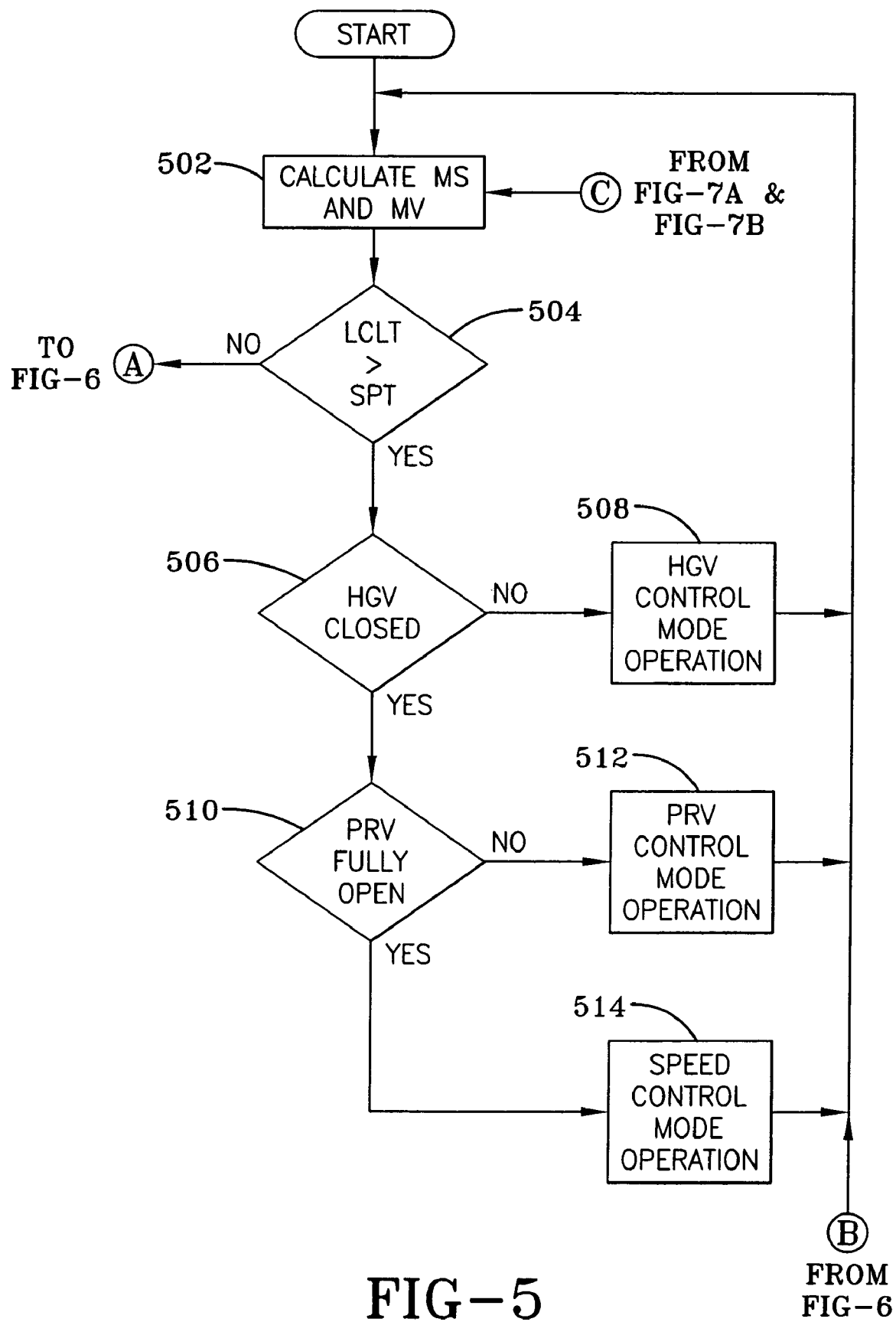
FIGS. 5 and 6 illustrate a flowchart of one embodiment of a control process of the present invention.

In a preferred embodiment, the capacity control program can control the speed of the turbine 14 (and the compressor 12), the position of the pre-rotation vanes 80 and the position of the hot gas bypass valve 84 in response to changes in the leaving chilled liquid temperature (LCLT) from the evaporator 18. FIGS. 5-7B illustrate an embodiment of the capacity control process for the capacity control program of the present invention. FIG. 5 generally illustrates the loading process for the system 10 and FIG. 6 generally illustrates the unloading process for the system 10. Referring now to FIG. 5, the process begins in step 502 by calculating the minimum turbine speed (MS) and the minimum pre-rotation vane position (MV) in response to the system pressure differential (PD), which is calculated by subtracting the evaporator pressure from the condenser pressure.

Figure 7A:
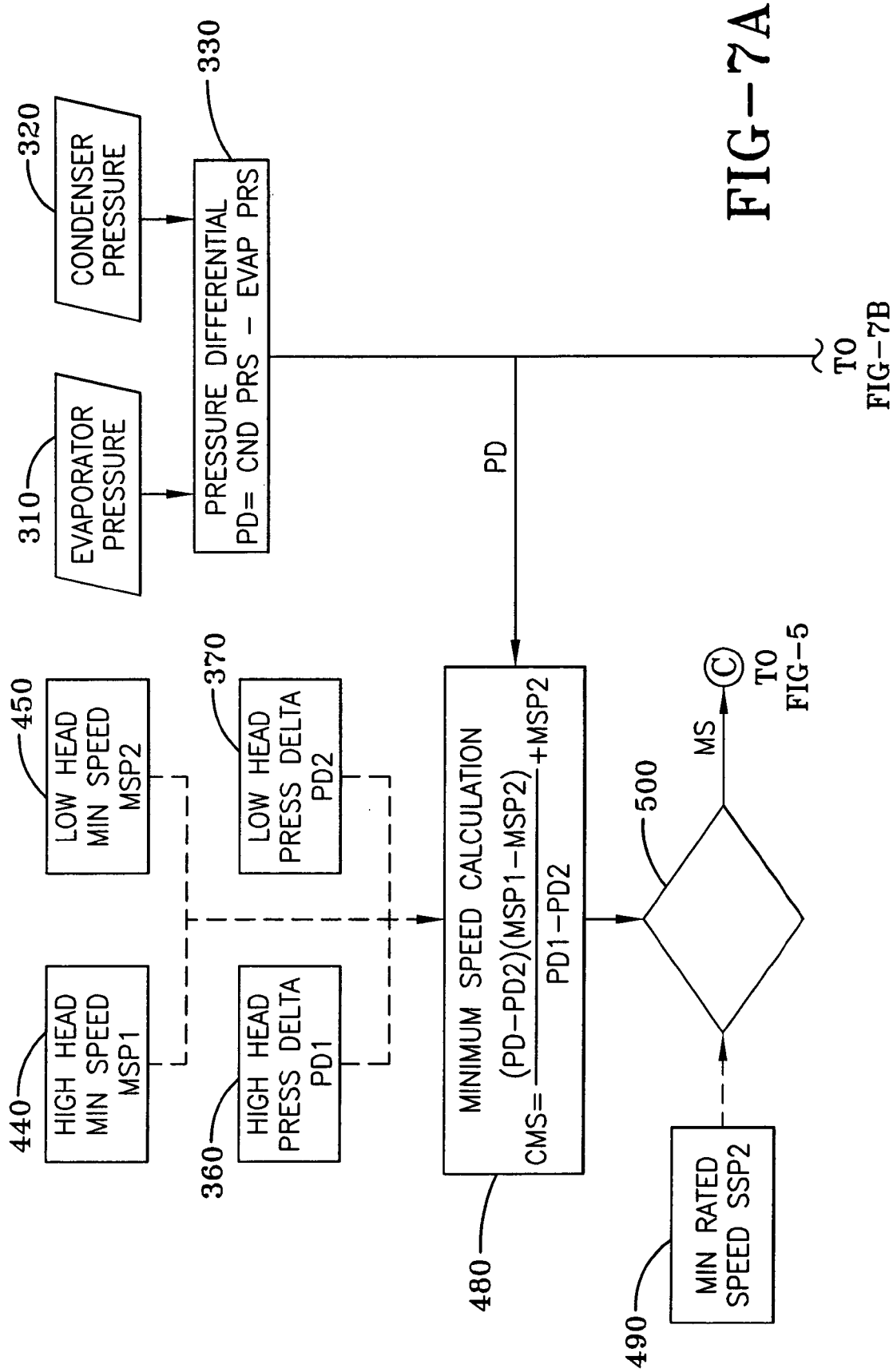

FIGS. 7A and 7B illustrate a logic diagram for calculating the minimum turbine speed (MS) and the minimum pre-rotation vane position (MV) in step 502 of FIG. 5. The logic begins in block 310, where the evaporator pressure is measured by the evaporator refrigerant vapor pressure sensor and a representative signal is sent to the control panel 90. In block 320, refrigerant condenser pressure is measured by the refrigerant condenser pressure sensor and a representative signal is sent to the control panel 90. In block 330, a representative value of the system pressure differential or head (PD), which is the difference between the refrigerant condenser pressure and evaporator pressure, is determined by subtracting the evaporator pressure taken in block 310 from the condenser pressure taken in block 320. The system pressure differential is then used in calculating both the minimum turbine speed (MS) and the minimum pre-rotation vane position (MV).

To determine the minimum pre-rotation vane position (MV), the process starts in block 340, where a minimum desired vane position at high head (MVP1) for the pre-rotation vanes 80 is established or set as a percentage of the fully open position for the pre-rotation vanes 80. In block 350, a minimum desired vane position at low head (MVP2) is established or set as a percentage of the fully open position for the pre-rotation vanes 80. In block 360, a maximum desired pressure differential or pressure delta at high head (PD1) for the compressor 12 is set or established. In block 370, a minimum desired pressure differential or pressure delta at low head (PD2) for the compressor 12 is set or established. The established values in blocks 340, 350, 360 and 370, can be entered into user interface 94 and stored in memory 92. Preferably, the values in blocks 340, 350, 360 and 370 remain constant during operation of the system 10, however, the values may be overwritten or adjusted through entry at the user interface 94 or by operation of the central control algorithm. Next, in block 380, the values from blocks 340, 350, 360, and 370 and the pressure differential (PD) from block 330 are used in a minimum vane position calculation to determine minimum pre-rotation vane position (MV). The minimum pre-rotation vane position (MV) is calculated as shown in equation 1.

$$MV = [((PD-PD2)(MVP1-MVP2))/(PD1-PD2)] + MVP2 \quad [1]$$

This calculated minimum pre-rotation vane position (MV), which is a percentage of the fully open position, is returned to step 502 in FIG. 5.

To determine the minimum turbine speed (MS), the process starts in block 440, where a desired speed at high head (MSP1) for turbine 14 and compressor 12 is set or established. In block 450, a desired speed at low head (MSP2) for turbine 14 and compressor 12 is set or established. In addition and as discussed above, in block 360, a maximum desired pressure differential or pressure delta at high head (PD1) for the compressor 12 is set or established. In block 370, a minimum desired pressure differential or pressure delta at low head (PD2) for the compressor 12 is set or established. In one embodiment, the value for blocks 440 and 450 can be set or established based upon startup testing of system 10 with selected PDs and loads, although established values from other chillers of similar design may also be used in blocks 440 and 450.

The established values in blocks 440, 450, 360 and 370, can be entered into user interface 94 and stored in memory 92. Preferably, the values in blocks 440, 450, 360 and 370 remain constant during operation of the system 10, however, the values may be overwritten or adjusted through entry at the user interface 94 or by operation of the central control algorithm. Next, in block 480, the values from blocks 440, 450, 360, and 370 and the pressure differential (PD) from block 330 are used in a minimum speed calculation to determine a calculated minimum turbine speed (CMS) as shown in equation 2.

$$CMS = [((PD-PD2)(MSP1-MSP2))/(PD1-PD2)] + MSP2 \quad [2]$$

In block 490, the minimum rated speed for turbine 14 and compressor 12 (SSP2) is set or established. Preferably, SSP2 is predetermined by the specific turbine 14 and compressor 12 incorporated into the system 10, and programmed into the control panel 90. In block 500, the minimum turbine speed (MS) is determined to be the larger of SSP2 and CMS. This determined minimum turbine speed (MS) is returned to step 502 in FIG. 5.

Figure 6:
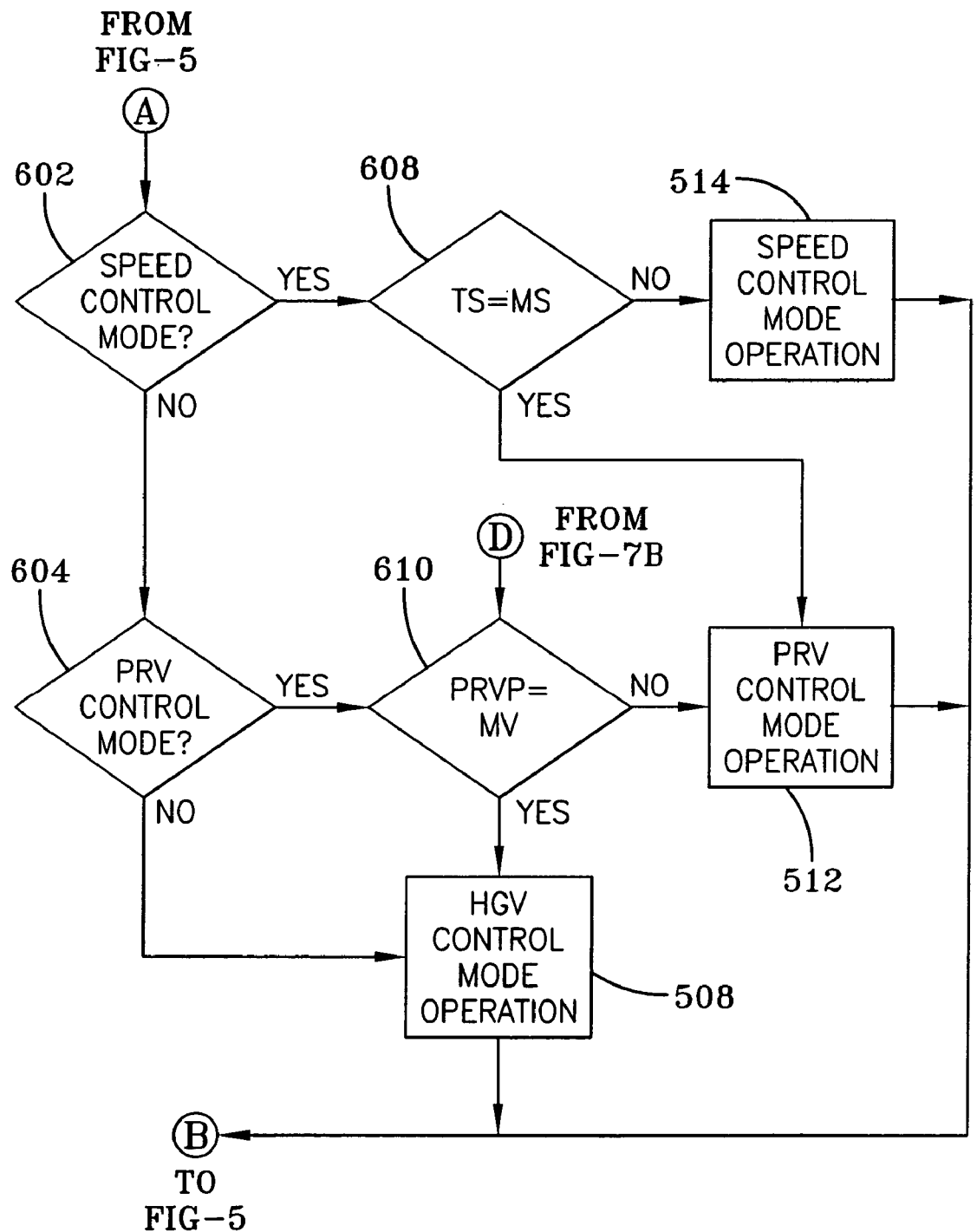

Referring back to FIG. 5, in step 504, the leaving chilled liquid temperature (LCLT) is compared to the desired setpoint temperature for the LCLT (SPT). If the LCLT is greater than the SPT, then the process proceeds to step 506. Otherwise, the process proceeds to step 602 as illustrated in FIG. 6. In step 506, the hot gas bypass valve (HGV) 84 is checked to determine whether it is open or closed. If the HGV 84 is open in step 506, the process proceeds to step 508 to control the system components in accordance with an HGV control mode, as discussed in greater detail below, and the process returns to step 502. If the HGV 84 is closed in step 506, the process proceeds to step 510 to determine whether the pre-rotation vanes (PRV) 80 are in a fully open position.

The HGV control mode operation from step 508 can load unique tuning parameters to control the operation of the hot gas bypass valve 84 thus ensuring that the control algorithm response matches the system response to a change in the hot gas bypass valve position. In the HGV control mode of operation, during the loading of the compressor 12, the hot gas bypass valve 84 is ramped closed, the pre-rotation vanes 80 are maintained at the minimum pre-rotation vane position (MV) and the speed of the turbine 14 is maintained at the minimum turbine speed (MS). As the system pressure differential (condenser pressure minus evaporator pressure) increases, the outputs of the minimum turbine speed (MS) and the minimum pre-rotation vane position (MV) from step 502 can also increase. As a result of the change in the minimum turbine speed (MS) and the minimum pre-rotation vane position (MV) the corresponding control commands or signals for the speed set point to control the governor valve 48 and thereby the speed of the turbine 14 and compressor 12 and the vane control to control the position of the pre-rotation vanes 84 are immediately set to the appropriate higher values to prevent surging. If the load on the compressor 12 is light and the LCLT decreases to within 2° F. of the SPT, the HGV control mode can begin modulating the HGV 84 to prevent overshooting of the SPT as the chilled water loop is pulled down to the SPT.

Referring back to step 510, if the PRV 80 are not fully open, the process proceeds to step 512 to control the system components in accordance with a PRV control mode, as discussed in greater detail below, and the process returns to step 502. If the PRV 80 are fully open in step 510, the process proceeds to step 514 to control the system components in accordance with a speed control mode, as discussed in greater detail below, and the process returns to step 502.

The PRV control mode operation from step 512 can load unique tuning parameters to control the operation of the pre-rotation vanes 80 thus ensuring that the control algorithm response matches the system response to a change in the PRV position. In the PRV control mode of operation, during the loading of the compressor 12, the hot gas bypass valve 84 is maintained in the closed position, the pre-rotation vanes 80 are ramped to a fully open position from the larger of the minimum start-up value position (PRVM) or the minimum pre-rotation vane position (MV) and the speed of the turbine 14 is maintained at the minimum turbine speed (MS). As the system pressure differential (condenser pressure minus evaporator pressure) increases, the output of the minimum turbine speed (MS) from step 502 can also increase. As a result of the change in the minimum turbine speed (MS) the corresponding control commands or signals for the speed set point to control the governor valve 48 and thereby the speed of the turbine 14 and compressor 12 are immediately set to the appropriate higher values to prevent surging. If the load on the compressor 12 is light and the LCLT decreases to within 2° F. of the SPT, the PRV control mode can begin modulating the PRV 80 to prevent overshooting of the SPT as the chilled water loop is pulled down to the SPT.

The speed control mode operation from step 514 can load unique tuning parameters to control the speed setpoint thus ensuring that the control algorithm response matches the system response to a change in the speed of the turbine 14 and compressor 12. In the speed control mode of operation, during the loading of the compressor 12, the hot gas bypass valve 84 is maintained in the closed position, the pre-rotation vanes 80 are maintain in an open position (at least 90% of the fully open position) and the speed of the turbine 14 is increased from the minimum turbine speed (MS) to the desired speed to maintain the leaving chilled liquid temperature (LCLT) at setpoint (SPT).

Referring now to FIG. 6, in step 602, the capacity control program is checked to determine if it is operating in the speed control mode. If the capacity control program is not operating in the speed control mode, the process proceeds to step 604. However, if the capacity control program is operating in the speed control mode in step 602, the process then proceeds to step 608. In step 608, the speed of the turbine (TS) is checked to determine if it is equal to the minimum turbine speed (MS). If TS is equal to MS in step 608, then the process proceeds to step 512 to control the system components in accordance with the PRV control mode and the process returns to step 502. However, if TS is not equal to MS in step 608, the system components are controlled in accordance with the speed control mode, step 514, and the process returns to step 502.

As discussed above, the speed control mode operation from step 514 can load unique tuning parameters to control the speed of the turbine 14 and compressor 12. In the speed control mode of operation, during the unloading of the compressor 12, the hot gas bypass valve 84 is maintained in the closed position, the pre-rotation vanes 80 are maintained in an open position (at least 90% of the fully open position) and the speed of the turbine 14 is decreased toward the minimum turbine speed (MS) to maintain the leaving chilled liquid temperature (LCLT) at setpoint (SPT). As the system pressure differential decreases, the output of the minimum turbine speed (MS) from step 502 can also decrease because the compressor 12 is capable of stable operation with less refrigerant gas flow. As a result of the change in the minimum turbine speed (MS) the corresponding control commands or signals for the speed set point to control the governor valve 48 and thereby the speed of the turbine 14 and compressor 12 are set to the appropriate lower value to maintain stable operation.

In step 604, the capacity control program is checked to determine if it is operating in the PRV control mode. If the capacity control program is operating in the PRV control mode in step 604, the process then proceeds to step 610. In step 610, the position of the pre-rotation vanes (PRVP) is checked to determine if it is equal to the minimum pre-rotation vane position (MV). If PRVP is equal to MV in step 610, then the process proceeds to step 508 to control the system components in accordance with the HGV control mode and the process returns to step 502. However, if PRVP is not equal to MV in step 610, the system components are controlled in accordance with the PRV control mode, step 512, and the process returns to step 502.

As discussed above, the PRV control mode operation from step 512 can load unique tuning parameters to control operation of the pre-rotation vanes 80. In the PRV control mode of operation, during the unloading of the compressor 12, the hot gas bypass valve 84 is maintained in the closed position, the speed of the turbine 14 is maintained at the minimum turbine speed (MS), and the pre-rotation vanes 80 are ramped to the minimum pre-rotation vane position (MV) to maintain the leaving chilled liquid temperature (LCLT) at setpoint (SPT). As the system pressure differential decreases, the output of the minimum turbine speed (MS) from step 502 can also decrease. As a result of the change in the minimum turbine speed (MS) the corresponding control commands or signals for the speed set point to control the governor valve 48 and thereby the speed of the turbine 14 and compressor 12 are set to the appropriate lower values after a programmable time delay to maintain maximum efficiency of operation.

As the pre-rotation vanes 80 are closed to the minimum desired vane position at low head (MVP2) to correspond to the reduction in the capacity of compressor 12, the pre-rotation vanes 80 are not further closed to reduce capacity. As discussed above with regard to the calculation for MV, as the system differential pressure (PD) approaches the minimum desired pressure differential at low head (PD2), the minimum pre-rotation vane position (MV) approaches the minimum desired vane position at low head (MVP2). Accordingly, when PD reaches PD2, MV is equal to MVP2, and pre-rotation vanes 80 are positioned in the lowest desired percent full open vane position, i.e., PRVP is equal to MV. As the load continues to drop, the low system pressure differential (PD) introduces a desirability to modulate hot gas bypass valve 84 in the HGV control mode, see step 610, in response to changing temperatures, since compressor 12 is operating at a minimal desired pressure differential and therefore close to a surge condition.

In alternate embodiment, to avoid operations at a very low system pressure differentials, such as, for example 20 to 40 psi, the capacity control program may be used to prevent the system pressure differential (PD) from decreasing to or below the minimum desired pressure differential at low head (PD2). To accomplish this operational control mode with a decreasing load, the pre-rotation vanes 80 are closed to a pre-selected position and, upon further load reduction, the hot gas bypass valve 84 is opened and operated in the HGV control mode when the pre-rotation vanes 80 reach the preselected position. With reference to FIG. 7A and 7B, block 400 is an adjustable setpoint (HGVRAT) selected by a user and input into user interface 94. The setpoint of block 400 is used to maintain a minimum selected system pressure differential (PD) that is preferably greater than PD2. In block 410, the minimum pre-rotation vane position (MV %) is determined to be the larger of HGVRAT and MV (from block 380). The capacity control program then determines whether the pre-rotation vanes 80 have reached the corresponding minimum pre-rotation vane position (MV %) from block 410. In this alternate embodiment, step 610 from FIG. 6 is changed to compare PRVP and MV % (instead of MV). If PRVP has not reached MV %, the pre-rotation vanes 80 are used to control capacity in the PRV control mode in step 512. If PRVP has reached MV %, the pre-rotation vanes 80 are maintained at MV % and the hot gas bypass valve 84 is opened for operation in the HGV control mode in step 508.

Referring back to step 604, if the capacity control program is not operating in the PRV control mode, the process proceeds to step 508 to control the system components in accordance with the HGV control mode and the process returns to step 502. As discussed above, the HGV control mode operation from step 508 can load unique tuning parameters to control operation of the hot gas bypass valve 84. In the HGV control mode of operation, during the unloading of the compressor 12, the speed of the turbine 14 is maintained at the minimum turbine speed (MS), the pre-rotation vanes 80 are maintained at the minimum pre-rotation vane position (MV), or in an alternate embodiment MV %, and the hot gas bypass valve 84 is opened to maintain the leaving chilled liquid temperature (LCLT) at setpoint (SPT). As the system pressure differential decreases, the outputs of the minimum turbine speed (MS) and the minimum pre-rotation vane position (MV) from step 502 can also decrease. As a result of the change in the minimum turbine speed (MS) and the minimum pre-rotation vane position (MV) the corresponding control commands or signals for the speed set point to control the governor valve 48 and thereby the speed of the turbine 14 and compressor 12 and the vane control to control the position of the pre-rotation vanes 84 are set to the appropriate lower values after a programmable time delay to maintain maximum efficiency of operation.

The capacity control program can override the normal control operation in response to certain events. One example of an override event is the detection of a high or low refrigerant pressure in the evaporator 18 or the refrigerant condenser 16. If a measured evaporator pressure or condenser pressure is determined to be outside of the acceptable range of operation, i.e., the pressure is either too high or too low, the capacity control program operates in an override control mode to unload the system 10 in a manner similar to that shown in FIG. 6. The capacity control program uses information, e.g., a tieback signal, from the control commands just before the override event in determining the appropriate control commands for the override event. This use of information in transitioning between normal operation and override operation can provide a bumpless transition between the two modes of operation. The unloading of the system is controlled in response to the override control algorithm and the system pressure differential, thus preventing unsafe operation and an unnecessary shutdown. Once the monitored parameter has returned to within the acceptable range for a predetermined amount of time the capacity control can return to normal control operation using a bumpless transition similar to that described above.

Another example of an override event can occur when, during high load or pulldown conditions, the turbine 14 may be capable of producing more torque than the acceptable torque rating for the compressor bearings. The governor valve actuator output is monitored to determine if the speed control mode operation from step 514 attempts to open the governor valve 48 more than a preset value (determined by field testing at start up). If the governor valve 48 is to be opened to a position greater than the preset value, the capacity control program operates in an override control mode to unload the system 10 in a manner similar to that shown in FIG. 6. The capacity control program uses information, e.g., a tieback signal, from the control commands just before the override event in determining the appropriate control commands for the override event. This use of information in transitioning between normal operation and override operation can provide a bumpless transition between the two modes of operation. The unloading of the system is controlled in response to the override control algorithm and the system pressure differential, thus preventing unsafe operation and an unnecessary shutdown. With the load reduced, the turbine 14 can begin to accelerate and the speed control mode of operation can begin to close the governor valve 48, thus limiting the torque output of the turbine 14. Once the governor valve actuator output has returned to within the acceptable range for a predetermined amount of time the capacity control can return to normal control operation using a bumpless transition similar to that described above.

Still another example of an override event can occur when, during high load or pulldown conditions, the turbine 14 may be capable of producing more torque or power than the acceptable torque rating for the compressor bearings. However, in this example, the turbine first stage pressure is monitored instead of the governor valve actuator output. A setpoint for the turbine first stage pressure is determined based on the steam inlet temperature and pressure so that the override controller can automatically adapt to fluctuations in the quality of the steam supplied to the turbine inlet. If the turbine first stage pressure increases above the calculated set point, the capacity control program operates in an override control mode to unload the system 10 in a manner similar to that shown in FIG. 6. The capacity control program uses information, e.g., a tieback signal, from the control commands just before the override event in determining the appropriate control commands for the override event. This use of information in transitioning between normal operation and override operation can provide a bumpless transition between the two modes of operation. The unloading of the system is controlled in response to the override control algorithm and the system pressure differential, thus preventing unsafe operation and an unnecessary shutdown. With the load reduced, the turbine 14 can begin to accelerate and the speed control mode of operation from step 514 can begin to close the governor valve 48, thus reducing the first stage pressure and limiting the torque output of the turbine 14. Once the turbine first stage pressure has returned to a value that is less than the calculated setpoint for a predetermined amount of time, the capacity control can return to normal control operation using a bumpless transition similar to that described above.

In another embodiment of the present invention, the capacity control program can be used with a fixed speed compressor. During operation at fixed speed, the primary method of capacity control for compressor 12 involves adjustment of pre-rotation vanes 80 and hot gas bypass valve 84. The capacity control program preferably adjusts the pre-rotation vanes 80 before adjusting the hot gas bypass valve 84 to provide greater system efficiency during fixed speed operation.

As discussed above, a change in load is detected by a change in the leaving LCLT. Similar to the PRV control process discussed above, the capacity control program sends a signal to adjust pre-rotation vanes 80 to a calculated minimum vane position to satisfy the load condition. The calculated minimum vane position is preferably a function of the pressure differential between refrigerant condenser 16 and evaporator 18. While the pre-rotation vanes 80 are adjusted to reduce capacity, the hot gas bypass valve 84 remains closed. At very low pressure differentials, as the calculated minimum vane position approaches zero, capacity is reduced by incrementally opening the hot gas bypass valve 84.

In some operational modes, it may be desirable to operate with the pre-rotation vanes 80 fully closed. With the pre-rotation vanes 80 fully closed, hot gas bypass valve 84 is modulated for capacity control based upon leaving chilled liquid temperature. If the load continues to decrease with the pre-rotation vanes 80 fully closed, the leaving chilled liquid temperature will continue to decrease. In the event that the leaving chilled liquid temperature decreases to below a predetermined amount lower than a predetermined setpoint, the hot gas bypass valve 84 is modulated to maintain the leaving chilled liquid temperature at the desired setpoint.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of controlling the capacity of a chiller system driven by a steam turbine, the method comprising the steps of:
   providing a steam system having a steam supply, a steam turbine and a steam condenser connected in a steam loop;
   providing a refrigerant system having a compressor, a refrigerant condenser, and an evaporator connected in a refrigerant loop, wherein the compressor is driven by the steam turbine;
   sensing a value representative of a load of the refrigerant system;
   determining a system pressure differential of the refrigerant system; and
   controlling a speed of the steam turbine in response to the sensed load value and the determined system pressure differential to control capacity of the chiller system.

2. The method of claim 1 further comprising the steps of:
   providing pre-rotation vanes to regulate flow of refrigerant to the compressor; and
   controlling a position of the pre-rotation vanes in response to the sensed load value and the determined system pressure differential to control capacity of the chiller system.

3. The method of claim 2 further comprising the steps of:
   providing a hot gas bypass valve to regulate flow of refrigerant between a high pressure side of the refrigerant system and a low pressure side of the refrigerant system; and
   controlling the hot gas bypass valve in response to the sensed load value and the determined system pressure differential to control capacity of the chiller system.

4. The method of claim 3 wherein:
   the step of controlling a speed of the steam turbine includes adjusting a speed of the steam turbine to maintain a desired system load condition;
   the step of controlling a position of the pre-rotation vanes includes positioning the pre-rotation vanes in a predetermined minimum position, wherein the predetermined minimum position is based on the system pressure differential; and
   the step of controlling the hot gas bypass valve includes positioning the hot gas bypass valve in a closed position.

5. The method of claim 4 wherein the predetermined minimum position for the pre-rotation vanes prevents the compressor from operating in a surge condition.

6. The method of claim 3 wherein:
   the step of controlling a speed of the steam turbine includes operating the steam turbine at a predetermined minimum speed, wherein the predetermined minimum speed is based on the system pressure differential;
   the step of controlling a position of the pre-rotation vanes includes adjusting a position of the pre-rotation vanes to maintain a desired system load condition; and the step of controlling the hot gas bypass valve includes positioning the hot gas bypass valve in a closed position.

7. The method of claim 6 wherein the predetermined minimum speed for the steam turbine prevents the compressor from operating in a surge condition.

8. The method of claim 3 wherein:
the step of controlling a speed of the steam turbine includes operating the steam turbine at a predetermined minimum speed, wherein the predetermined minimum speed is based on the system pressure differential;
the step of controlling a position of the pre-rotation vanes includes positioning the pre-rotation vanes in a predetermined minimum position, wherein the predetermined minimum position is based on the system pressure differential; and
the step of controlling the hot gas bypass valve includes adjusting a position of the hot gas bypass valve to maintain a desired system load condition.

9. The method of claim 8 wherein:
the predetermined minimum position for the pre-rotation vanes prevents the compressor from operating in a surge condition; and
the predetermined minimum speed for the steam turbine prevents the compressor from operating in a surge condition.

10. The method of claim 2 wherein the step of controlling a position of the pre-rotation vanes includes:
determining a minimum position for the pre-rotation vanes in response to the determined system pressure differential, wherein the determined minimum position for the pre-rotation vanes prevents the compressor from operating in a surge condition; and
sending a control signal to the pre-rotation vanes to set a position of the pre-rotation vanes to the determined minimum position.

11. The method of claim 1 wherein the step of controlling a speed of the steam turbine includes:
determining a minimum speed for the steam turbine in response to the determined system pressure differential, wherein the determined minimum speed for the steam turbine prevents the compressor from operating in a surge condition; and
sending a control signal to the steam turbine to set a speed of the steam turbine to the determined minimum speed.

12. The method of claim 1 wherein the step of sensing a value representative of a load of the refrigerant system includes determining a leaving chilled liquid temperature from the evaporator.

13. The method of claim 1 wherein the step of determining a system pressure differential includes:
measuring a condenser pressure;
measuring an evaporator pressure; and
subtracting the measured evaporator pressure from the measured condenser pressure to determine the system pressure differential.

14. The method of claim 1 further comprising the step of engaging an override control to control the speed of the steam turbine in response to a detection of a fault condition in the chiller system.

15. The method of claim 14 wherein the fault condition in the chiller system comprises at least one of an out of range condenser pressure or evaporator pressure, a steam turbine first stage pressure measurement exceeding a predetermined pressure setpoint, or a governor valve position measurement exceeding a predetermined position setpoint.

16. A chiller system comprising:
a steam system comprising a steam supply, a steam turbine and a steam condenser connected in a steam loop;
a refrigerant system comprising a compressor, a refrigerant condenser, and an evaporator connected in a refrigerant loop, wherein the compressor is driven by the steam turbine; and
a central control panel to control operation of both the steam system and the refrigerant system, the central control panel comprising a capacity control system, the capacity control system being configured to adjust a speed of the steam turbine to control the capacity of the refrigerant system in response to a leaving chilled liquid temperature and a system pressure differential.

17. The chiller system of claim 16 wherein:
the refrigerant system further comprises pre-rotation vanes to regulate flow of refrigerant to the compressor; and
the capacity control system being configured to adjust a position of the pre-rotation vanes to control the capacity of the refrigerant system in response to a leaving chilled liquid temperature and a system pressure differential.

18. The chiller system of claim 17 wherein:
the refrigerant system further comprises a hot gas bypass valve to regulate flow of refrigerant between a high pressure side of the refrigerant system and a low pressure side of the refrigerant system; and
the capacity control system being configured to adjust a position of the hot gas bypass valve to control the capacity of the refrigerant system in response to a leaving chilled liquid temperature and a system pressure differential.

19. The chiller system of claim 18 wherein the capacity control system is configured to control the pre-rotation vanes, the hot gas bypass valve and the speed of the compressor to prevent the compressor from operating in a surge condition.

20. The chiller system of claim 18 wherein the capacity control system is configured to operate in one of a hot gas bypass control mode, a pre-rotation vane control mode, or a turbine speed control mode to control the capacity of the refrigerant system.

21. The chiller system of claim 20 wherein:
the hot gas bypass control mode includes operation at a predetermined minimum turbine speed and a predetermined minimum pre-rotation vane position;
the pre-rotation vane control mode includes operation with a closed hot gas bypass valve and at a predetermined minimum turbine speed; and
the turbine speed control mode includes operation with a closed hot gas bypass valve and at a predetermined minimum pre-rotation vane position.

22. The chiller system of claim 16 wherein the compressor, refrigerant condenser, evaporator and steam turbine are integrally mounted on a structural frame.

23. The chiller system of claim 16 wherein a cooling water output from the refrigerant condenser is operatively connected to a cooling water input to the steam condenser.

24. A chiller system comprising:
a steam system comprising a steam supply, a steam turbine and a steam condenser connected in a steam loop;

a refrigerant system comprising a compressor, a refrigerant condenser, and an evaporator connected in a refrigerant loop, wherein the compressor is driven by the steam turbine;

a turbine baseplate configured and disposed to mount the steam turbine in the chiller system, the turbine baseplate comprising a coupling device to rigidly connect the turbine baseplate and the compressor; and a central control panel to control operation of both the steam system and the refrigerant system.

25. The chiller system of claim 24 wherein:

the turbine baseplate includes a base portion, the base portion being configured and disposed to support at least a portion of the steam turbine; and the coupling device being disposed substantially perpendicularly to the base portion.

26. The chiller system of claim 25 wherein the compressor includes a housing with a machined face and the coupling device is connected to the machined face of the housing.

27. The chiller system of claim 24 wherein the turbine baseplate has a first end disposed adjacent the compressor and a second end opposite the first end, the first end of the turbine baseplate is mounted on a mounting arrangement for the compressor and the second end of the turbine baseplate is mounted on a tube sheet for the evaporator.

* * * * *